R. H. ANDERBERG.
PACKING MATERIAL.
APPLICATION FILED JULY 31, 1911.

1,088,252.  Patented Feb. 24, 1914.

Witnesses:
Harry L. Allen
A. L. Folsom

Inventor:
Ralph H. Anderberg,
by Wright Brown Quinby & May
Attorneys.

UNITED STATES PATENT OFFICE.

RALPH H. ANDERBERG, OF CHELSEA, MASSACHUSETTS.

PACKING MATERIAL.

1,088,252.  Specification of Letters Patent.  Patented Feb. 24, 1914.

Application filed July 31, 1911. Serial No. 641,533.

*To all whom it may concern:*

Be it known that I, RALPH H. ANDERBERG, a citizen of the United States, and resident of Chelsea, in the county of Suffolk and State of Massachusetts, have invented certain new and useful Improvements in Packing Material, of which the following is a specification.

This invention has for its object to provide certain improvements in packing material of the general character of that set forth in Letters Patent of the United States No. 967,392, dated August 16, 1910.

Figure 1:
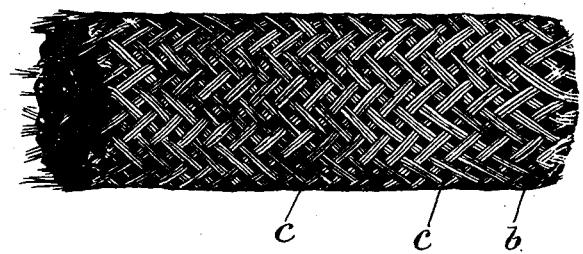
Figure 2:

On the drawing, Figure 1 represents a piece or section of the packing embodying the present improvements. Fig. 2 shows some of the material detached.

According to my invention, I employ a mass of disconnected independent blocks or pieces *a* of resilient material. This material consists preferably of alternate layers of duck or other textile material and rubber vulcanized together, although I may utilize any equivalent material which is compressible and more or less resilient. I found that, by cutting these pieces in irregular form but of substantially prismatic shape, they fit more closely together and are more adapted to slide relatively to each other when compressed in the stuffing box than where they are oblong, as in Patent No. 967,392 previously referred to. These blocks or pieces are heavily coated with a lubricant such as oil and powdered or flaked graphite so that each piece has adherent to it and carries with it a relatively large amount of the graphite. Some difficulty is experienced in inserting these materials in certain stuffing boxes as where the material must be inserted from below or where the box is comparatively inaccessible, and I have therefore devised a holder for the packing material by which it may be handled conveniently and introduced easily into the box or gland. This holder consists of a loosely braided tube *b* of fiber such as cotton, jute or the like, the threads being separated so as to provide comparatively large apertures *c* through which the packing material may impinge upon the moving part such as a piston rod which passes through the stuffing box.

The packing material is forced into the braided tube, as shown in Fig. 1, and the tube is made in indeterminate lengths if desired, or in regular lengths, and the ends of the tubes are closed, by tying each end with a string to prevent the dislocation of the packing material. By reason of the loose braiding of the tube, the graphite and lubricant, with which the blocks or pieces of the packing are thickly coated, immediately come in contact with the moving element and thoroughly lubricate it, the tube soon wearing out by the friction of the element. The compression of the cap of the stuffing box against the packing material tends to squeeze out the graphite from between the pieces and force it against the said moving element.

I have not illustrated a stuffing box, but it will be understood that the braided tube with its inclosed packing will be coiled in the box and will be compressed therein by the cap of the box to the compactness desired.

I claim:

1. A packing material comprising a plurality of independent blocks of resilient material, each coated with graphite, and forming a compressible mass with relatively movable elements, and a destructible or temporary open-mesh tubular flexible holder or covering having large apertures for the exposure of the graphite and its emission when under compression.

2. A packing material consisting of a destructible open-mesh holder and a loose mass of relatively movable, substantially prismatic blocks or pieces of resilient material, each block or piece being coated with graphite.

In testimony whereof I have affixed my signature, in presence of two witnesses.

RALPH H. ANDERBERG.

Witnesses:
MARCUS B. MAY,
P. W. PEZZETTI.